(No Model.) 3 Sheets—Sheet 1.

O. ANDERSON.
CENTRIFUGAL CREAMER.

No. 576,994. Patented Feb. 16, 1897.

WITNESSES:
Robert Sollberger
C. B. Pitney

INVENTOR:
Oscar Anderson,
BY Drake G. ATTY'S.

(No Model.) 3 Sheets—Sheet 2.

O. ANDERSON.
CENTRIFUGAL CREAMER.

No. 576,994. Patented Feb. 16, 1897.

WITNESSES:
Robt Sollberger
C. B. Pitney

INVENTOR:
Oscar Anderson,
BY Drake & Co. ATTY'S.

(No Model.) 3 Sheets—Sheet 3.

O. ANDERSON.
CENTRIFUGAL CREAMER.

No. 576,994. Patented Feb. 16, 1897.

WITNESSES: INVENTOR

Robt Sollberger
E. S. Pitney

Oscar Anderson,

BY Drake & Co. ATTY'S.

UNITED STATES PATENT OFFICE.

OSCAR ANDERSON, OF NEWARK, NEW JERSEY.

CENTRIFUGAL CREAMER.

SPECIFICATION forming part of Letters Patent No. 576,994, dated February 16, 1897.

Application filed January 23, 1896. Serial No. 576,519. (No model.)

*To all whom it may concern:*

Be it known that I, OSCAR ANDERSON, a citizen of the United States, residing at Newark, in the county of Essex and State of New Jersey, have invented certain new and useful Improvements in Centrifugal Creamers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to secure a more simple construction whereby the parts subjected to the fluid may be cleansed with increased convenience and ease, and at the same time to provide a device having greater efficiency, so that the blue milk issuing from the bowl after the separating process will be more completely devoid of cream.

The invention consists in the improved centrifugal creamer and in the arrangements and combinations of parts thereof, all substantially as will be hereinafter set forth, and finally embraced in the clauses of the claim.

Figure 1:
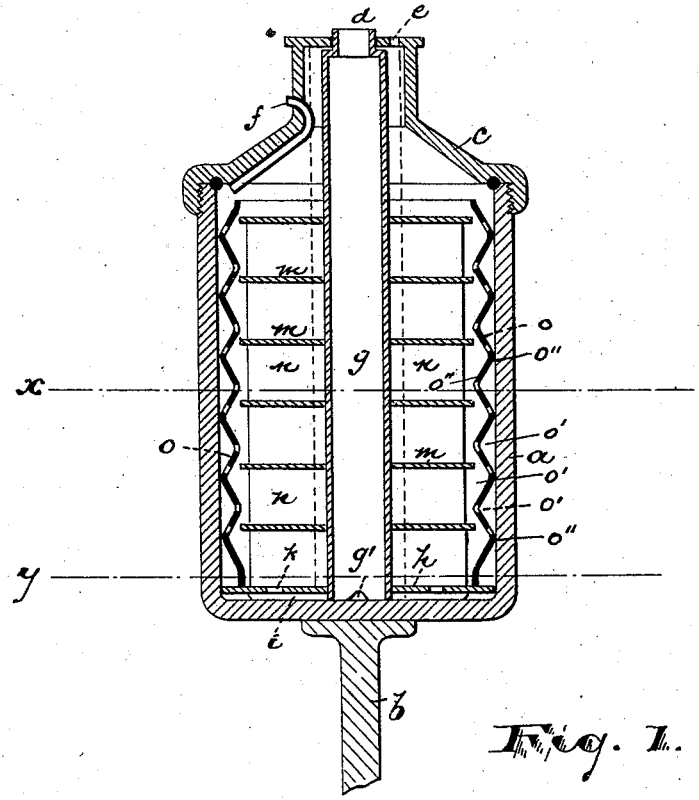
Figure 2:
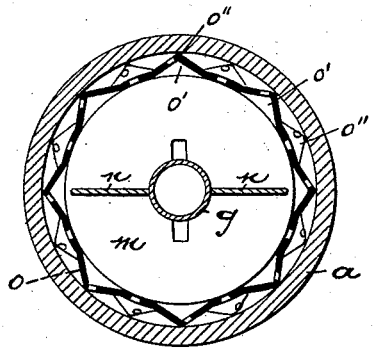
Figure 3:
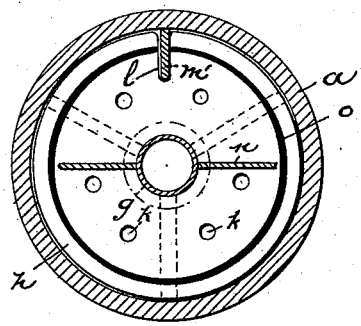
Figures 4, 5:
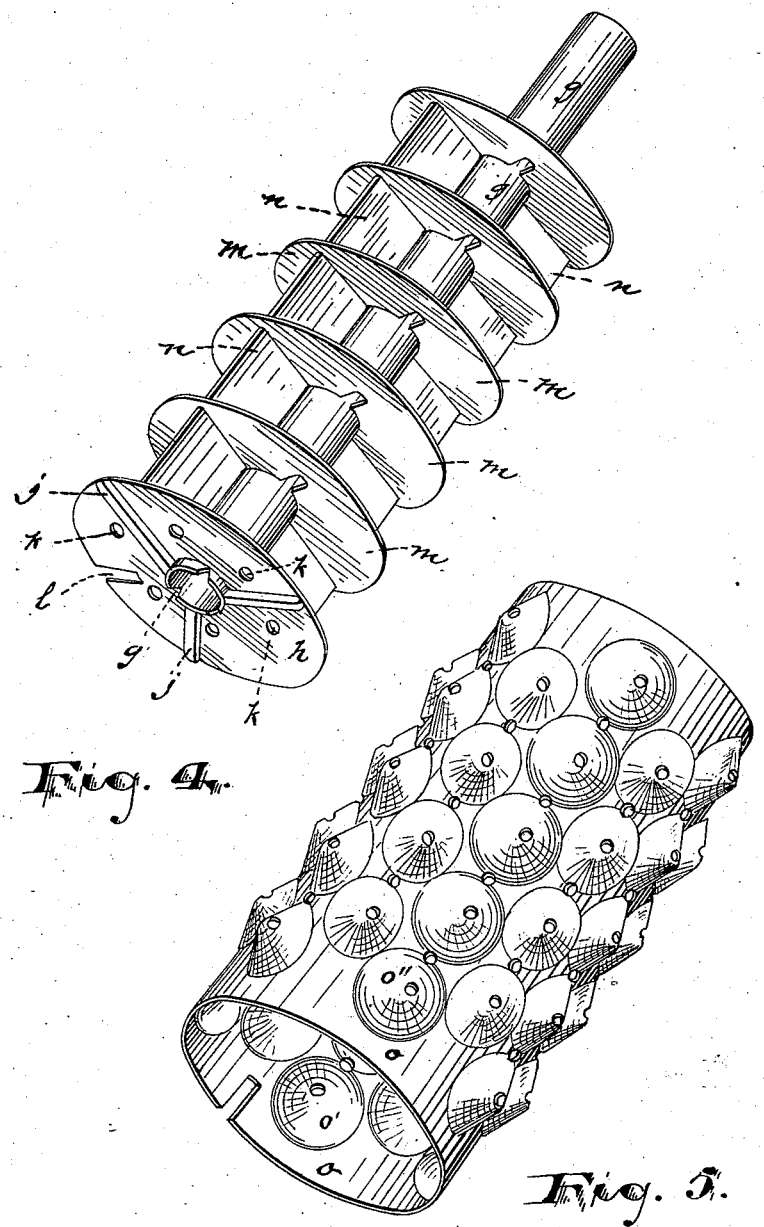
Figure 6:
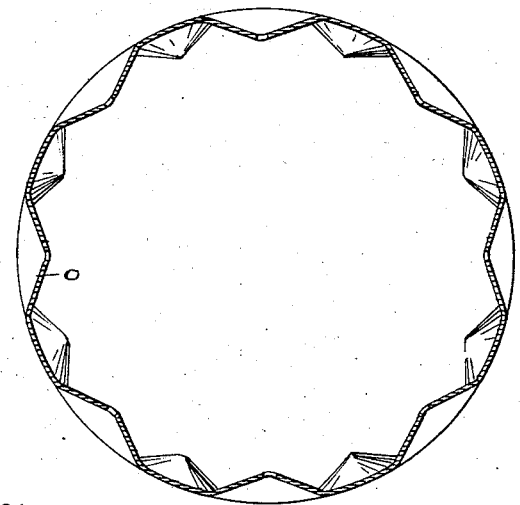
Figure 7:
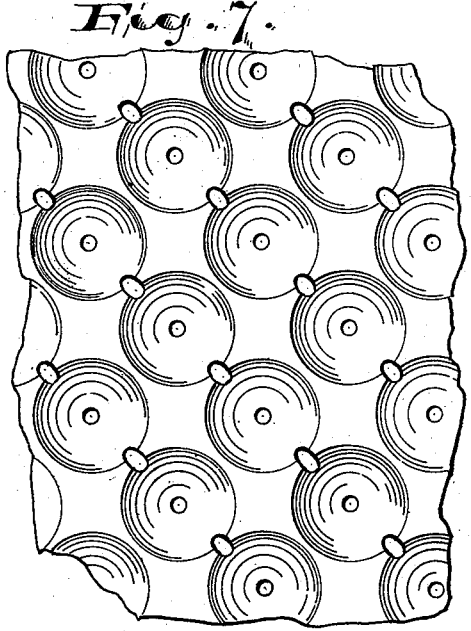
Figure 8:
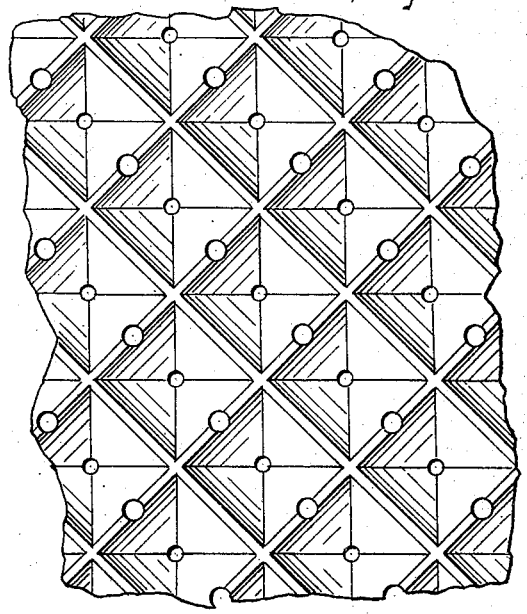

Referring to the accompanying drawings, in which like letters of reference indicate corresponding parts in each of the views, Figure 1 is a central vertical section of the rotary creaming-bowl and its contents. Fig. 2 is a horizontal section of the same, taken at line *x*. Fig. 3 is a horizontal section taken at line *y*, Fig. 1. Fig. 4 is a perspective view of the feed-tube and partitions extending outward therefrom, said parts being joined or united and adapted to be removed from the bowl together; and Fig. 5 is a perspective view of a cylindrical partition arranged outside of and around the said feed-tube and partitions and held in place thereby. Fig. 6 is a sectional detail showing a modification in the construction of the said cylindrical partition; and Figs. 7 and 8 are plans or face views showing the tin or sheet-metal plate from which the last said partition is formed after being stamped and before being turned into cylindrical form, and also showing modifications in the shape of the die-impressions.

In said drawings, *a* indicates an ordinary bowl having the vertical and rotary shaft *b* and a cover *c*, each being formed and arranged in any manner common in centrifugal creamers. The said cover *c* is provided with a central opening *d*, through which the new milk is supplied to the bowl, and at one side of said opening with a cream exit, duct, or passage *e* and with a blue-milk passage, exit, or duct *f*, all of which may be arranged in any manner common in the art. The said bowl *a* and the shaft *b*, upon which it is seated, may be arranged in connection with a suitable motive mechanism, (not shown,) also in any manner desired. Within said bowl is arranged at the center a vertical supply-tube *g*, which extends downward from the opening *d* to the bottom of the bowl, where the said tube is notched, as at *g'*, Figs. 1 and 4, to allow an outflow of the milk to the creaming-chamber. At the said bottom of the bowl the said feed-tube is provided with a horizontal partition or flange *h*, which is raised a little above the bottom surfaces of the bowl, as shown in Fig. 1, to form a vertically-narrow overflow or distributing passage *i* for the milk. On the under side the said flange is provided with supporting projections or ribs *j*, which serve to keep the flange in proper relation to the bottom, and also as wings to impart rotary motion to the milk as it flows through the said distributing passage or chamber.

Said flange *h* is also provided at points about midway between the center and periphery thereof with a series of openings *k*, leading upward to the creaming or separating chamber above the said flange. Said flange extends outward to or very near to the interior vertical walls of the bowl, engaging the same at suitable points, so as to hold the said flange rigidly and against lateral displacement and the lower end of the creaming-tube in fixed position. The said flange is also notched, as at *l* in Fig. 4, to engage a guide projection *m'*, Fig. 3, on the interior of the bowl. This projection *m'* serves to bring the separating-partitions always to the one position of balance and adjustment when being assembled, as will be understood. Above the said flange the said tube is preferably provided with a series of horizontal or outwardly-extending partitions *m m m*, which are rigidly secured to said tube and removable from the bowl therewith. To give stiffness and strength to these partitions and also to impart rotary motion to the fluid, I provide between said partitions m m vertical bracing-wings n, which extend vertically from one partition to another, so as to hold said partition in place when being cleaned or otherwise handled, and also extend from the tube outward near to the peripheries of the said horizontal partitions. These parts are all soldered or otherwise joined together, so that the frame comprising the tube and partitions will be very strong to resist the usual wear and tear to which it is subjected, both in the creaming and in the cleansing operations, when said frame is removed from the bowl. The said wings n are stationed at opposite sides of the feed-tube, one wing being in line or approximately in line with another opposite wing, so as to form spaces between the horizontal partitions and on opposite sides of the said flange, which will be open and free to admit of an easy and quick brushing of the frame in the cleansing operation, allowing the work to be performed with greater facility and thoroughness. While I prefer to form the partitions m m in horizontal planes, I may vary the same therefrom to a greater or less degree without departing from the invention. Around said frame and seated on the flange h is a cylindrical partition o. This consists of a single sheet of stamped metal, the stamped surfaces presenting to the fluid a large collection of funnel-shaped or flaring recesses o' and protuberances o'', the small ends of which lie toward and from the center of the bowl, as in Figs. 2, 5, and 6.

Where the protuberances o'' extend outward, as in Figs. 2 and 5, the conical or funnel-shaped impressions in the sheet metal are perforated near the apices to form blue-milk passages, the perforations being preferably at one side of each apex, so as to prevent the said openings from being covered and closed when in contact with the walls of the bowl, and also to prevent the same from being clogged by dirt or other extraneous matter in the fluid. The said partition o is also provided with cream-passages at the crests of the inward projections which are somewhat smaller than the blue-milk passages, so as to concentrate the cream particles and maintain a full flowage through said passages, and thus prevent the blue milk from passing outward therethrough and causing a commingling of cream and blue milk rather than a separation, as desired. The apices of the outward projections of the cylinder provide bearings directly upon the walls of the bowl, and the partition is materially relieved of strain and cannot be torn asunder by centrifugal force and broken or otherwise impaired in its usefulness. Between said cylinder and the frame are free passages for the blue milk due to the irregularity of the interior surface of said cylinder, and as the blue milk moves upward through said passages it is forced in part to the outside of the partition o, the part more rich in cream remaining on the inside and the poorer blue milk passing to the outside and coming into contact with the large accumulating-surfaces presented by the irregular partition. The protuberances o'' in the preferred construction form passages which extend all around the same, as will be understood upon reference to Figs. 2 and 5, so that the blue milk will be allowed both vertical and horizontal movements in relation to the partition o, the blue milk having a free circulation as it gradually moves upward, and thus all said blue milk has a full and complete opportunity of engaging the surface and depositing any cream it may be carrying. By having the cream-passages of the partition o quite close together the cream cannot accumulate unduly and become churned, but is immediately fed to the cream-walls.

The partition o is preferably of a single sheet of metal, simply turned into cylindrical form and firmly joined at the edges. It is thus of very cheap construction, is open at opposite ends, so as to allow a free and easy brushing in the cleansing operation, and as it bears directly at a multiplicity of points directly upon the wall of the bowl there is no danger of its being broken asunder by centrifugal action.

The chambers formed between the laterally-extending partitions m, attached to the milk-supply tube g, are closed from any direct communication with the interior of the milk-supply tube, so that the milk in passing through said tube cannot be thrown outwardly through perforations or lateral openings through said tube against the cream lying in the cream-wall, whereby the said cream would be disturbed and again mixed with the blue milk, but said cream, after it has once attained the wall in the bowl, has an uninterrupted flow through openings in the partitions m, at or near the tube g, from one chamber to the next and finally out from the bowl.

In operating the device the new milk is fed downward through the tube g and passes out through the passages g' into the passages i, beneath the flange h. Here it is distributed by the perforations k and flows upward through the last-named passages into the lowest of the horizontal chambers formed by the partitions. Here the upward movement of the fluid is retarded for a time, because of the largeness of the passages, and the larger cream particles are given a full opportunity to pass to the cream-wall (indicated by the dotted outline in Figs. 1 and 3) before being forced out near the periphery of the bowl, where the centrifugal force is the greater. The remaining fluid is directed upward and is brought into contact with the first horizontal partitions m and the outside vertical cylinder o. Some of the milk will enter into the next chamber in the series and again be retarded in its speed until another portion of the cream particles are given an opportunity to pass to the creaming-wall, but the less rich fluid will flow through the blue-milk passages of the cylinder o and will be frequently brought into contact with the surfaces of the said cylinder, when the smaller particles of cream and those that are difficult of separation will be deposited and combined with others, forming a mass which will be easily operated upon by centrifugal force and caused to flow inward to the cream-wall.

The large surfaces formed by the numerous conical or flaring impressions presented to the fluid where it is largely devoid of cream tends to fully strain out and unite the small particles remaining, so that they are brought together and are more easily acted upon by centrifugal force and separated.

The frequency of contact of the upwardly-flowing liquid with the inclined surfaces, taken in connection with the facilities allowed for the conjoined small cream particles to pass to the cream-wall, is peculiarly efficient in securing a high separation of the cream from its vehicular fluid. This operation is repeated from chamber to chamber as the blue milk flows upward, so that it is almost wholly divested of cream at the point of final issuance.

The construction also secures greater uniformity in the quality of the cream, preventing the large cream-globules from being broken, and thus giving to the cream an oily or buttery appearance objectionable in the market. The cylinder, being of simple construction and easy at every point on its surface of access by a brush or cloth, is very convenient for cleansing, and as it bears at a multiplicity of points on the wall of the bowl it is very firm and durable under centrifugal force.

The cylinder o may be employed to advantage with any other interior devices, and various other changes may be employed without departing from the spirit or scope of the invention.

Having thus described the invention, what I claim as new is—

1. The combination with a rotary bowl and means for rotating the same, of a milk-supply tube arranged at the center of the bowl and imperforate to deliver all the milk at the bottom thereof, a series of horizontal or outwardly-extending partitions arranged within the bowl and fixed to said milk-supply tube and removable therewith and the perforated and irregular cylindrical partition arranged outside of said horizontal partitions, all substantially as set forth.

2. The combination with the rotary bowl having openings therein for the new milk, cream and blue milk, and means for rotating said bowl, of a series of partitions arranged within said bowl and forming a vertical series of chambers at or near the center of the bowl, and a vertical partition arranged outside of and around said chambers within said bowl, the last partition having irregular surfaces and provided with openings for the cream and blue milk at points in its vertical length closely adjacent to the edges of the first said partition, all substantially as set forth.

3. The combination with the rotary bowl having ducts for the blue milk, cream and new milk, and means for rotating said bowl, of a central feed-tube g, imperforated to deliver all the milk at one end of the bowl, partitions m, extending outward from said feed-tube and a cylindrical partition arranged around said partitions m, and provided with blue-milk and cream passages, substantially as set forth.

4. In a centrifugal creamer, the combination with the bowl a, and means for rotating the same, of a cylindrical partition, comprising a plate having protuberances and opposite corresponding recesses, the protuberances bearing directly upon the bowl and holding the cylinder in place, said protuberances being perforated near their apices and bases to allow of the flow of blue milk and cream therethrough, and leaving blue-milk passages entirely therearound to allow both a vertical and horizontal flow, substantially as set forth.

5. In a centrifugal creamer, the combination with the bowl and means for operating the same, of a cylinder open at its opposite ends and having protuberances entirely surrounded by passages for the fluid, to allow a free horizontal and vertical flow, each protuberance being perforated near its point of farthest outward projection and the cylinder being also perforated at the base of its protuberances, substantially as set forth.

6. In a centrifugal creamer, the combination with the bowl, and means for operating the same, of a sheet-metal cylinder with protuberances which do not extend continuously around the periphery of the bowl, said protuberances being stamped or pressed in said cylinder to give the same irregularity of shape, the protuberances leaving passages for the fluid entirely around the same and having perforations at or near their apices and bases, substantially as set forth.

7. In a centrifugal creamer, the combination with the bowl and means for operating the same, of a sheet-metal cylinder with discontinuous peripheral protuberances on the outside and corresponding recesses on the inside, the protuberances being entirely surrounded with fluid-passages admitting both a horizontal movement of the fluid and a vertical flow as it gradually passes to its exit, said cylinder having perforations for the cream and blue milk, all substantially as set forth.

8. In a centrifugal creamer, the combination with a rotary bowl and means for operating the same, of a perforated partition comprising a piece of impressed sheet metal, turned into a cylindrical form, the impressions due to the stamping, forming peripherally-discontinuous perforated protuberances on one side of the cylinder and recesses at the other side, the protuberances admitting a vertical flow of fluid between, substantially as set forth.

9. In a centrifugal creamer, the combination with the bowl and means for operating the same, of a sheet-metal cylinder with protuberances and perforations, and a frame having partitions forming a vertical series of chambers, the outer edges of the said partition extending out to the inner side of the cylinder at the bases of the protuberances, and ducts whereby the bowl may be supplied with milk at one end and the cream and blue milk may be separately emitted at the other, substantially as set forth.

10. In a centrifugal creamer, the combination with the bowl and means for operating the same, of a sheet-metal cylinder having protuberances and perforations, and a frame comprising an imperforate milk-supply tube having partitions forming a vertical series of chambers and a flange on which the said cylinder is seated, substantially as set forth.

11. In a centrifugal liquid-separator, the combination with the bowl and means for operating the same, of the milk-supply tube open to receive the milk at one end of the bowl and to deliver the same at the other, a series of partitions $m$, fastened upon said tube and extending laterally therefrom and forming chambers therebetween, said chambers having open communication with one another near said milk-supply tube to allow a flow of cream at the cream-wall and direct communication of the said milk-tube with said chambers being cut off or closed to prevent an intermingling of the new milk with the cream of the cream-wall, substantially as set forth.

12. In a centrifugal separator, the combination with the bowl and means for operating the same, of the new-milk-supply tube, open to receive the milk at one end of the bowl, and to deliver the same at the other, a series of partitions fastened thereto and extending laterally therefrom, forming chambers between which are open to one another near said tube, to allow a flow of cream at the cream-wall, wings $n$, arranged between said partitions and extending from one to another to strengthen said partitions in their relations to one another, substantially as set forth.

13. In a centrifugal creamer, the combination with the bowl and means for operating the same, of a milk-supply tube having a series of laterally-extending partitions fastened thereto forming chambers therebetween which latter are closed from direct communication with the passages for the new milk within said tube but are open at or near said tube to allow a flow of cream from one chamber to the next, and a cylindrical partition arranged within the bowl at the interior wall thereof and having perforated protuberances and corresponding recesses, the partition being also perforated at said recesses, the lateral partitions of the milk-supply tube extending out to the cylinder and the recesses serving as fluid-passages from one chamber to another, substantially as set forth.

14. The combination with the rotary bowl and means for operating the same, said bowl having exits and inlets for the new milk, cream and blue milk, of an interior irregularly-formed cylindrical partition, a tube disposed centrally within said partition, and a series of horizontal partitions disposed around said tube, said tube having an opening for the emission of milk at one end of said series of horizontal partitions only, so that the milk will all be forced to flow over the edges of said partitions, substantially as set forth.

In testimony that I claim the foregoing I have hereunto set my hand this 12th day of December, 1895.

OSCAR ANDERSON.

Witnesses:
CHARLES H. PELL,
C. B. PITNEY.